United States Patent

Green

[15] 3,644,666
[45] Feb. 22, 1972

[54] OPTICAL RANGE DISCRIMINATOR FOR LASER TV CAMERA

[72] Inventor: Milton Green, 980 Flanders Road, Mystic, Conn. 06355

[22] Filed: July 7, 1970

[21] Appl. No.: 52,874

[52] U.S. Cl. ..........................178/6.8, 178/7.6, 356/4, 356/17
[51] Int. Cl. ..........................G01c 3/08, H04n 7/18
[58] Field of Search ..................356/1, 3, 4, 5, 15, 16, 17; 178/6.8, 7.6

[56] References Cited

UNITED STATES PATENTS

| | | | |
|---|---|---|---|
| 3,516,743 | 6/1970 | McKown | 356/4 |
| 3,443,870 | 5/1969 | Morgan | 356/5 |
| 2,157,468 | 5/1939 | Walton | 178/7.6 |
| 3,372,230 | 3/1968 | Wurz | 178/7.6 |
| 3,555,178 | 1/1971 | Humiston | 356/5 |
| 3,446,555 | 5/1969 | Kahn | 356/5 |
| 3,442,193 | 5/1969 | Pagel | 356/4 |

Primary Examiner—Robert L. Richardson
Assistant Examiner—Joseph A. Orsino, Jr.
Attorney—Richard S. Sciascia, Louis B. Applebaum and Arthur L. Bowers

[57] ABSTRACT

An optical beam scanner having a pair of polygonal cylinders with exterior mirror faces to sweep a continuous incident laser beam between particular angular limits in one direction and between particular angular limits in the transverse direction, simulating line-by-line and frame-by-frame scanning. Reflections scattered back from objects in the path of the swept beam and incident to the line-by-line scanner are redirected by the line-by-line scanner toward a photomultiplier assembly which is angularly adjustable about the line-by-line scanner for range discrimination. A television monitor, synchronized with the scanners and intensity modulated by the photomultiplier output, images any reflecting object at the selected range and within the angular sweep limits of the beam.

2 Claims, 4 Drawing Figures

INVENTOR.
MILTON GREEN

INVENTOR.
MILTON GREEN

OPTICAL RANGE DISCRIMINATOR FOR LASER TV CAMERA

This invention described herein may be manufactured and used by or for the Government of the United States of America for governmental purposes without the payment of any royalties thereon or therefor.

BACKGROUND OF THE INVENTION

Continuous-wave laser systems have been known for use as viewing aids where direct visual observation is partly or wholly obscured by fog, or rain, and in darkness where clandestine observation is required. In such systems known in the art, a laser beam is swept line-by-line and frame-by-frame by a dual orthogonal polygonal mirrored cylinder scanner. Some of the laser beam energy reflected by discontinuities in the beam path is directed back toward the scanner. In the vicinity of the scanner, a photomultiplier equipped with a sharply tuned optical filter detects all incident reflected laser beam energy. A television monitor having he same line and frame scan rates as the swept laser beam is connected to the photomultiplier circuit, so that beam intensity in the television monitor is continuously related to the level of reflected laser energy sensed by the photomultiplier. All objects within range scanned by the laser beam and which scatter laser light back to scanner appear on the television monitor. There is no range discrimination. Also, resolution is poor because of beam spreading, stray reflections returned by random discontinuities in the propagation medium and by multiple bounce. Since energy is scattered back from objects anywhere in the entire range of the laser beam and within the angular scan limits, the noise level on the television screen masks images of interest. The range of a viewed target cannot be ascertained from such equipment.

SUMMARY OF THE INVENTION

This invention employs a laser, a mechanical-optical scanner, a photomultiplier assembly equipped with focusing lens and iris and sharply tuned optical filter, plus television monitor in an arrangement wherein the photomultiplier assembly sees only reflections off the line-by-line scanner, and at a particular angle, instead of all laser light scattered back from objects in the path of the propagated laser beam. The photomultiplier assembly is adjustable about the line-by-line scanner so that only that portion of scattered-back laser light returned from a selected range and direction is sensed by the photomultiplier. The focusing lens and iris function to direct to the photomultiplier only that laser light energy which arrives at the photomultiplier from the line-by-line scanner at that angle corresponding to looking at a particular range. The iris excludes extraneous rays arriving from slightly different angles and thus limits depth of field and sharpens the image on the television monitor. For directional discrimination, the equipment, except for the television monitor, is mounted on a platform for rotation in azimuth and for training in elevation-depression.

DESCRIPTION OF THE PREFERRED EMBODIMENT

Figure 1:
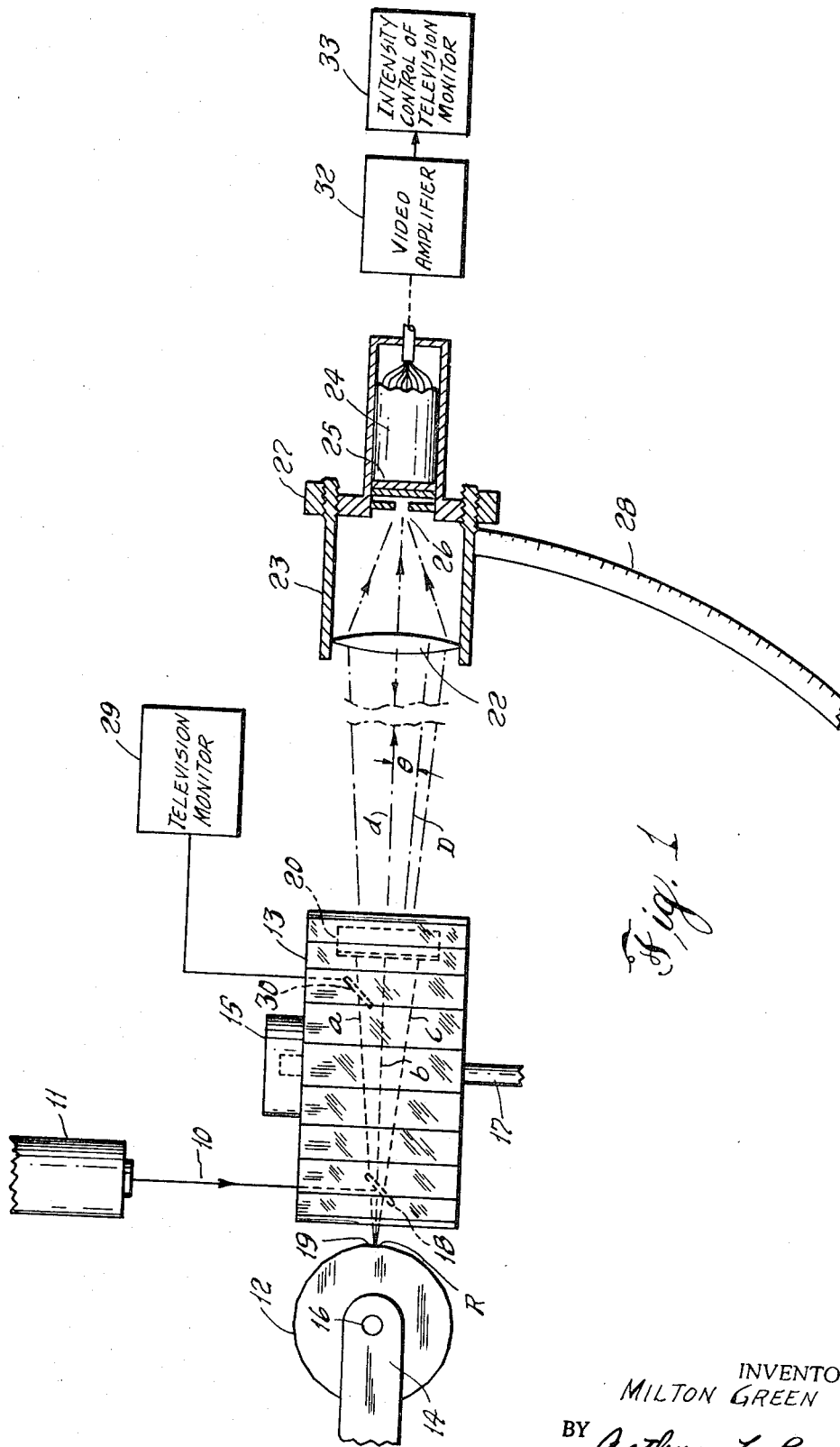
FIGS. 1 and 2 are top and side views respectively of an embodiment of this invention shown diagrammatically and including ray directions propagated and returned.
Figure 2:
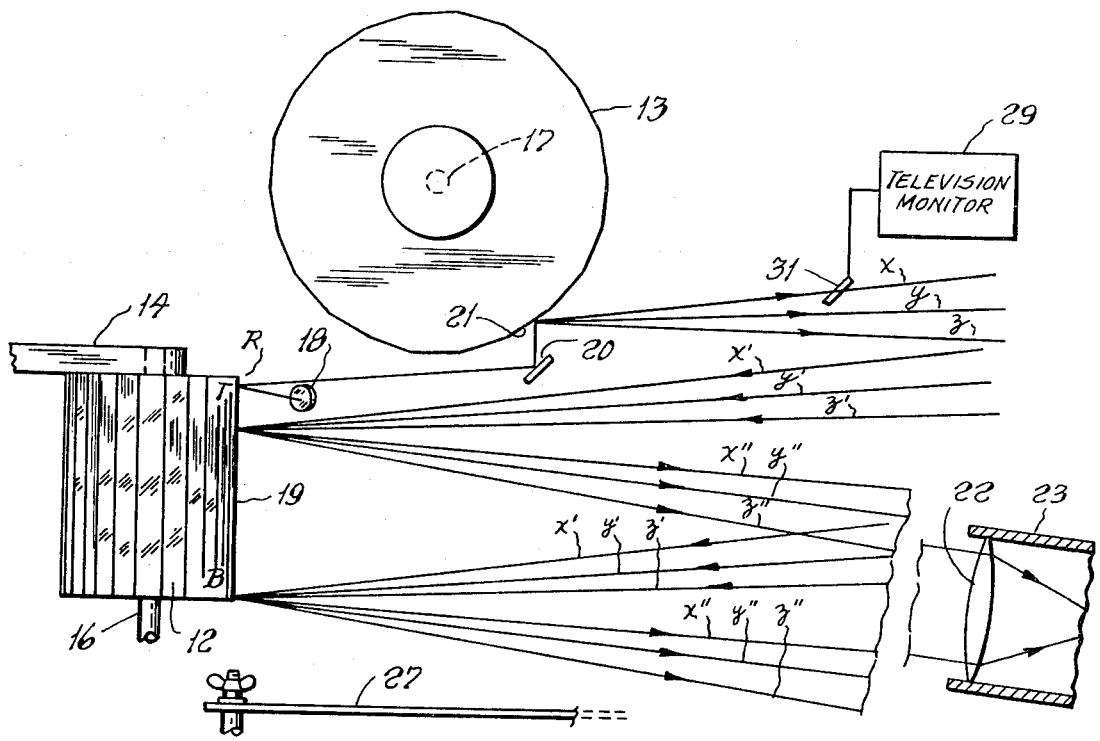
Figure 3:
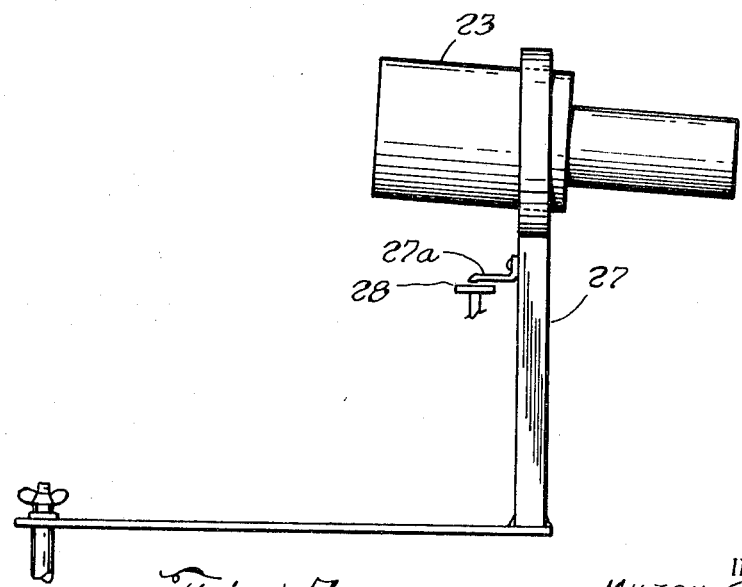
FIG. 3 shows an arcuately adjustable support for the photomultiplier assembly.

In FIGS. 1 and 2 there is shown a mechanical-optical scanner for propagating and sweeping a thin light beam viz about 1.5 millimeter diameter in a manner that simulates the deflection of the electron beam of a television receiver's cathode-ray tube in response to the influence of its horizontal and vertical deflection means. The mechanical-optical scanner deflects the thin light beam 10, emitted by a continuous beam optical laser 11, line-by-line and frame-by-frame as in a television receiver. Two polygonal cylinders 12 and 13 each having outer mirror faces and radial symmetry are mounted in bearings 14 and 15 respectively for rotation about orthogonal nonintersecting axis. The shafts 16 and 17 of the mirror cylinders are driven by precision, adjustable speed motors, not shown. The laser beam is directed to a fixed position small mirror 18 that is large enough to accommodate the beam, and small enough not to interfere with reflected rays. Mirror 18 redirects beam 10 toward the axis of mirror cylinder 12 for horizontal scanning or line-by-line scanning. In FIG. 1, the change in beam direction introduced by mirror 18 is 90°, and in FIG. 2, the redirected beam describes an angle of incidence of about 5° of the normal to the axis of cylinder 12, the direction of the beam from mirror 18 and the axis of cylinder 12 are coplanar. The beam strikes the end of the cylinder mirror which is in position 19 in FIGS. 1 and 2. When the cylinder 12 is rotated, the laser beam brushes each mirror face in succession and as the beam spot moves across the width dimension of each mirror face of cylinder 12, the reflection of the laser beam sweeps through an angular range which is twice the angle subtended by one face of cylinder 12, viz 2 (360°/i n) where $n$ equals the number of faces of cylinder 12; the limits of the angular range are indicated by $a$ and $c$ in FIG. 1; ray $b$ indicates the intermediate direction. When the beam moves off the edge of one mirror and onto the edge of the succeeding mirror of rotating cylinder 12, the beam reflection flies back as in line-by-line television scanning.

An elongated planar mirror 20 is fixedly supported in the path of the swept beam from mirror cylinder 12 as shown in FIG. 1 to redirect the swept beam to the mirror position 21 of mirror cylinder 13 as shown in FIG. 2 where it describes a linear path along mirror 21. When the mirror cylinder 13 also is rotated, the horizontally swept beam is deflected also through an angular range $x$–$z$ that is orthogonal to the other angular range $a$–$c$. The beam direction $y$ is intermediate the angular range $x$–$z$. The angular range $x$–$z$ is oblique relative to the axis of cylinder 12.

The rate of rotation of mirror cylinder 12 is very much greater than that of mirror cylinder 13. However, the horizontal sweep rate of the embodiment as designed for use in air can be much slower than the horizontal sweep rate if the embodiment is designed for use underwater. The attenuation underwater limits the range to several hundred meters, and in many situations to less than 100 meters; therefore the elapsed time between propagation of the beam and return is very short. In air the effective range is incomparably greater using an optical laser of the same power so that the time elapsed between propagation and return from the very much longer useful range is much greater.

The swept beam is propagated outward from mirror cylinder 13. Portions of the propagated beam energy are intercepted by objects in the path of the beam. Objects assumed along directions $x$–$y$, and $z$ respectively, scatter energy back; those rays intercepted by mirror 19 of cylinder 12 are indicated as rays $x'$, $y'$, and $z'$, respectively. When energy is scattered back by any object, the returned rays fill the mirror face because the cross section of the scattered energy returned to the scanner is much greater than the cross section of the propagated beam. Reflected rays $x'$ or reflected rays $y'$ or reflected rays $z'$ represent reflections that might be returned from any direction within the sweep angle $x$–$z$. Illumination of the entire mirror 19 is represented by identically designated rays intercepted by the top T and B of the mirror 19 in FIG. 2. The plural rays $x''$, or $y''$ or $z''$ are reflections of ray $x'$, $y'$ and $z'$ by mirror 19. The identically designated rays are parallel and are intercepted by collecting lens 22 mounted in holder 23 that nests a photomultiplier 24. An optical filter 25 preferably of the type known in the laser art, sharply tuned to the frequency of the optical laser is supported in front of the photomultiplier to reject radiation of frequencies other than that of the laser. In the case of deep underwater operation or elsewhere the laser light is the only significant source of radiation likely to be incident to the scanner cylinder, or in other situations where no disturbing light sources are present, the sharply tuned filter may be removed to dispense with filter attenuation of the incoming signal.

A fixed vertical slit or an adjustable vertical slit 26 is mounted in the housing in front of the filter and operates to minimize extraneous rays. This allows for flexibility in obtaining best picture resolution. If the slit is adjustable depth of field may be varied. The rays $x''$, $y''$, and $z''$ are brought to focus at the slit aperture. The lens is adjustable relative to the slit; for this purpose the housing parts are shown threadedly engaged. Any suitable focusing arrangement may be used. The angle $\theta$ in FIG. 1 between a propagated beam $d$ and the ray D, which is that part of the energy of beam d returned to the scanner 12 and again reflected by the same mirror face of the rotating scanner; the angle $\theta$ is a measure of the range of the object. The lens and photomultiplier holder 23 is supported by a bracket 27 selectively adjustable along a calibrated arcuate range scale 28 whose axis extends through point R of the cylinder 12 and is parallel to the cylinder axis. The bracket 27 carries an indicator pointer 27 $a$.

The range is selected by angularly positioning the opening or entrance slit of the photomultiplier assembly along the arcuate scale by manipulating the bracket 27. The bracket axis passes through point R.

A television monitor 29 serves to display an image of any object that intercepts the beam propagated by the scanner assembly. Horizontal and vertical sweep circuits of the television monitor are set to correspond to the product of rate of rotation and number of mirror faces of the horizontal and vertical scan cylinders 12 and 13 respectively. A photodiode 30 in FIG. 1 and a photodiode 31 in FIG. 2 along the limits of horizontal and vertical sweep angles deliver synchronization signals to the television monitor. The electron beam of the television monitor is intensity modulated in accordance with the output of photomultiplier 24 which is coupled by a video amplifier 32 to the intensity control portion 33 of the television monitor. Two or more ranges can be observed simultaneously by using two or more television monitors plus a photomultiplier assembly for each, at different range positions along the same arcuate indicator 28. Alternatively the arcuate indicator may be omitted and instead the scanner assembly may be provided with several fixed photomultiplier assemblies distributed arcuately whereby each looks at another range. A selector switch may be used to couple the output of one photomultiplier to the television monitor if more than one monitor is not feasible.

Figure 4:
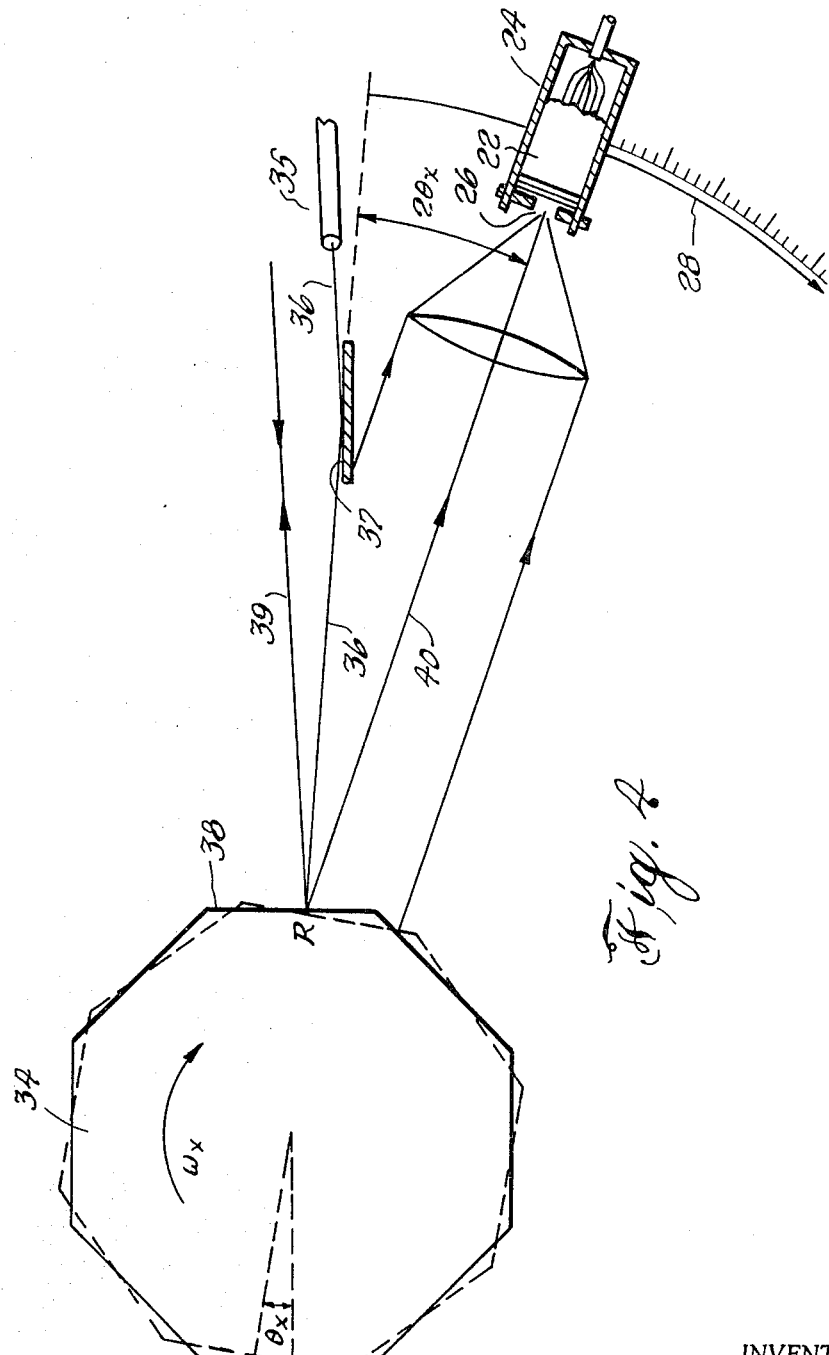
FIG. 4 illustrates the operation of the horizontal scanner.

FIG. 4 illustrates the interaction of the horizontal scanner and the laser beam. An octogonal cylinder 34 rotates about its axis at angular velocity $\omega_r$. A laser 35 emits a beam 36 which is bounced off mirror 37 to one end of mirror face 38 of the scanner, which in turn reflects the incident beam as beam 39, corresponding to the relationship shown in FIG. 1. The vertical scanner shown in FIGS. 1 and 2 is omitted. When the outgoing beam 39 encounters an object and is scattered a portion of the energy retraces the path of beam 39 after an elapsed time $t$. In the time $t$, the horizontal scanner has rotated through angle $\theta_r$ to the orientation shown in broken lines. The returned energy is reflected by the same face 38 of the arcuately displaced scanner. If the scanner were not rotating, the reflection returned along direction 39 would be bounced off the mirror face along the direction 36. Since the angle of incidence of the returned energy at mirror face 38 is increased by angle $\theta$, the angle of incidence plus the angle of reflection is increased by $2\theta$. Therefore returned beam 39 is bounced off mirror face 38 along direction 40 which is at angle $2\theta$ relative to the angle of the original beam 36 incident to the scanner. By locating the lens and photomultiplier assembly at the arcuate position displaced $2\theta$ from the beam direction 36, reflections of any object at a range which would be traversed twice by the laser radiation in the time cylinder 34 rotates through angle $\theta$ is directed to the photomultiplier and essentially all unwanted scattered rays from other than the selected range to not reach the photomultiplier.

The range is measured from point R. Point R is not fixed. As the cylinder rotates, it shifts between narrow limits. The axis about which the photomultiplier assembly is adjusted is established through the mean location of R. The mean location of R is determined as the intersection of beam 36 with mirror face 38 when angle $\phi$ between the reflecting face of the mirror and the plane defined by beam 36 and the axis of rotation of the cylinder 34 such that the following equation is substantially satisfied:

$$\cos \phi = 1/3 (\cos 180/N + 2).$$

N is the number of mirror faces of the cylinder. This position of point R is essentially the mean point of excursion of the intersection of the laser beam with the cylinder.

The vertical scanner moves so much more slowly than the horizontal scanner, it can be desirable to use a single mirror face rather than a full cylinder and drive that mirror arcuately to describe an arcuate excursion equal to that which would be achieved by a full frame-deflection cylinder and to quickly return the mirror from the end of an excursion to its starting position.

The entire assembly is mounted on a training platform not shown for directing the propagated beam.

This invention extends the range of optical observation under difficult conditions as compared to other optical systems known in the art. Because it can focus on a selected range and in a selected direction and because it can reject noise due to light scattering it presents a good image on the television receiver when direct observation is very poor or impossible. It is useful as a visual landing aid for aircraft in foggy and inclement weather because it will penetrate fog to a far greater range than any ordinary optical system and with a retroreflector equipped target it will penetrate fog to even a still greater range. It is useful for ships at sea maneuvering in fog darkness and by land vehicles proceeding through fog or in darkness and for underwater exploration and reconnaissance when provided with a laser emitting blue-green light. In fact, for short range submarine sighting and underwater navigation, it is an ideal complement to sonar particularly in hostile environments where silence is essential, detection is virtually impossible.

Obviously many modifications and variations of the present invention are possible in the light of the above teachings. It is therefore to be understood that within the scope of the appended claims the invention may be practiced otherwise than as specifically described.

I claim:

1. A mechanical optical scanner comprising two adjacent polygonal cylinders each having planar mirrored outer faces and having radial symmetry, means mounting the two cylinders so that their axes are orthogonal and nonintersecting, an optical laser for emitting a continuous beam, a mirror in the emission path of the optical laser to deflect the beam toward one end of one of said cylinders so that the deflected beam is coplanar with the axis of that cylinder and is at a small angle of incidence relative to the normal to the axis of that cylinder to reflect from the cylinder laterally outward of the cylinder and, a planar mirror positioned relative to the two cylinders to deflect a swept beam from said one cylinder longitudinally along the surface of the other cylinder, a photomultiplier assembly including a housing, optical lens, slit, optical filter sharply tuned to the laser frequency and photomultiplier for sensing laser beam energy returned from objects in the path of the propagated beam and bounced off said one cylinder, means supporting said photomultiplier assembly for arcuate adjustment about an axis essentially parallel to the axis of said one cylinder and passing through a median point of intersection of the laser beam from said first mirror and the surface of said one cylinder, a television monitor having deflection means for operating at the same rate as the laser beam sweep rates produced by the cylinders, means for vaying electron beam intensity in the television monitor in accordance with the signal level from the photomultiplier, two photodiodes in the path of the beam at one limit of its sweep range as propagated by each of the cylinders respectively for delivering sync signals to the deflection circuits of the television monitor, whereby the television monitor presents an image of that which is located at a range selected by arcuate positioning of the photomultiplier assembly.

2. A mechanical optical scanner as defined in claim 1 further including a range-calibrated arcuate scale along the adjustment path of the photomultiplier assembly.

* * * * *